March 3, 1931. J. C. CROWLEY 1,795,076
AIR GAUGE
Filed Feb. 15, 1928

Inventor
John C. Crowley
Kwis Hudson & Kent
Attorneys

Patented Mar. 3, 1931

1,795,076

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

AIR GAUGE

Application filed February 15, 1928. Serial No. 254,340.

This invention relates to an air or fluid pressure gauge particularly adapted for gauging the air pressure in a pneumatic tire, although it may also be used to gauge the pressure of any fluid maintained under pressure in a container.

Differently constructed air or pressure gauges have been devised in which a Bourdon tube has been employed as the pressure responsive element thereof usually operatively connected with the gauge pointer by a direct acting connection. However, it is well known that the expansion and contraction of Bourdon tubes is not always directly proportional to the pressure increase or decrease. This naturally results in a variance between the actual pressure and the pressure indicated by the position of the pointer on the scale of the gauge.

An object of the invention is to provide a pressure gauge wherein the pointer actuating mechanism is so arranged and so connected to the Bourdon tube that the motion transmitted to the pointer upon the expansion of the tube under pressure will cause the pointer to indicate upon the scale the correct reading.

Another object is to provide a pressure gauge wherein the pointer will remain in the pressure indicating position until returned to zero by a means operable from the exterior of the gauge casing.

Another object is to provide a pressure gauge of simple and rugged construction and formed of a relatively small number of parts.

Other objects and advantages will become apparent as the detailed description proceeds.

Figure 1:
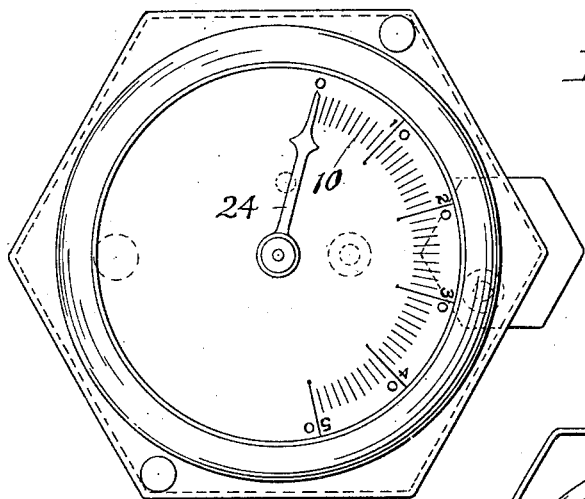

An embodiment of the invention is illustrated in the accompanying drawing, wherein Figure 1 is a top plan view of the gauge.

Figure 2:
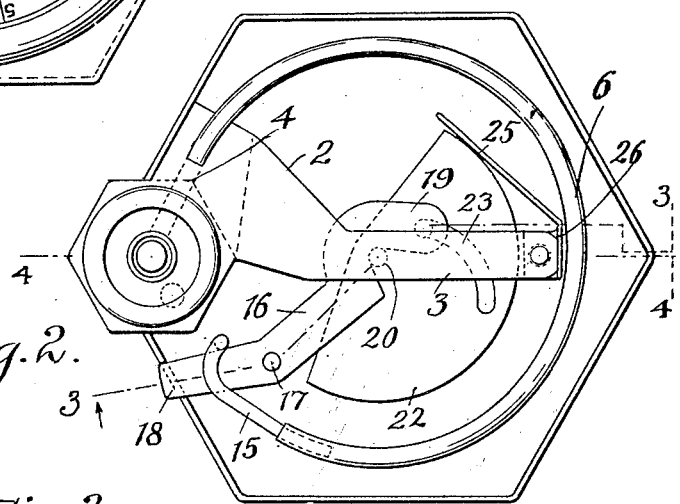
Figure 3:
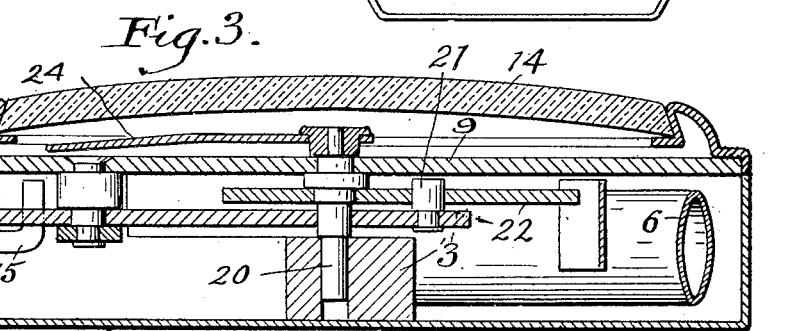
Figure 4:
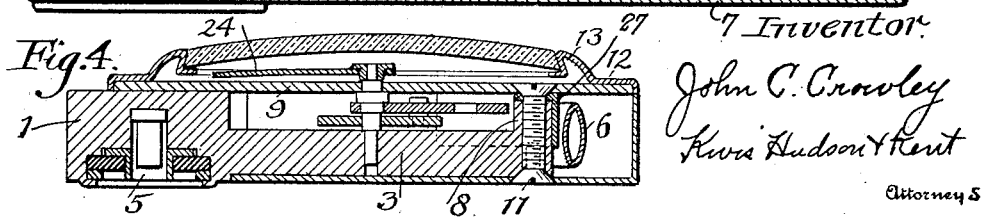

Figure 2 is a bottom plan view thereof, the position of the gauge being reversed from Figure 1, and Figures 3 and 4 are irregular vertical sections taken approximately on the lines 3—3 and 4—4, respectively, of Figure 2, the gauge being shown with the top side uppermost.

In the preferred embodiment, the gauge casing comprises a valve attaching and part supporting member, and an enclosing or housing portion. The valve attaching and part supporting member is of solid formation having an enlarged part 1, within which is arranged the valve engaging chuck, and an offset part 2 which has a part 3 extending diametrically transversely of the casing. The offset part 2 is provided with a bore 4 communicating with the air passage 5 in the part 1 and connected at its other end to a Bourdon tube 6. A metallic enclosing container 7 is secured to the parts 1 and 3 in such manner that a portion of the part 1 lies exteriorly of the casing so that the air chuck is exposed for connection to the valve stem. The inner end of the part 3 is provided with an enlargement 8 extending upwardly to the same height as the upper side of the part 1, and a plate 9, upon which is arranged the scale 10, is secured to their upper sides. This plate may be secured in position in any desirable manner, one form of securement being indicated in Fig. 4 by the two-part bolt 11. A metallic rim member 12 is secured to the upper side of the plate 9 and has an offset, annular bead 13 for retaining a lens 14.

The Bourdon tube 6 extends arcuately around the interior of the casing, being spaced the necessary distance from the walls thereof to allow for its expansion. The inner end of this tube carries a member 15 which is operatively associated with one end of a lever 16 pivoted at 17 on a suitable pin carried by the plate 9, the operative connection between the member 15 and the lever being such that the lever will move when the tube expands but not when it contracts. This lever is preferably in the form of a bell crank pivoted at the junction of its two angularly disposed arms, the outer and shorter of which is in operative association with the member 15 and extends outwardly as indicated at 18 through an opening in the side of the casing. The inner or longer arm of the lever extends inwardly of the casing, passing through and beyond the center thereof when in its normal position. The inner end of this arm is provided with an offset hooked portion 19 adapted to extend around the pin 20 journalled in the plate 9 and part 3, which pin forms a stop for movement of the lever in one direction. An upwardly extending pin 21 is carried by the lever adjacent the inner end of the longer arm thereof, being aligned with the pivot 17 centrally of the arm. As the lever 16 is rocked about its pivot 17, the pin 21 will move through an arc concentric with the axis of the pivotal movement of the lever.

A substantially semi-cylindrical plate 22, in the nature of a link, is fixedly mounted upon the pin 20 so as to rotate in unison therewith. The pin 20 and the plate 22 are connected at the center of the circle of which the plate is a part, so that the plate rotates on an axis concentric with such center. This plate has an arcuate slot 23 provided therein, the center of which is eccentric to the centers of movement of the lever and of the plate. The lever and the plate being operatively connected by means of the pin 21, carried by the former, engaging in said arcuate slot, it is quite apparent that when the lever 16 is swung about its pivot, the arcuate movement of the pin 21 will be translated into a sliding camming action within the slot 23 and will swing said plate together with the pin 20 in the same direction of rotation. When the lever is swung in the opposite direction, the pin 21 will also have a camming action in the slot 23 and return the plate to its original position.

The upper end of the pin 20 carries the pointer 24 suitably attached so as to rotate therewith. The parts are constructed and assembled so that when in the position shown in Figure 2, the pointer will register zero on the scale 10.

In order to compensate for the irregularities of the Bourdon tube, which does not always expand directly proportional to the pressure increases or decreases, the lever 16 and plate 22, together with their connections, are used, instead of a direct acting connection between the tube and pointer. Although other ratios may be chosen and used, the gauge herein shown is so constructed that a movement of the lever through 40° will move the plate through approximately 150°, and for every .1 of the total movement of the lever the plate will be moved .1 of its total movement.

The plate 22 is held in any position to which it is moved by a spring 25 engaging the circumferential edge of the plate. This spring has an offset portion 26 provided with a flange 27 at its upper edge which extends between the enlargement 8 of the part 3 and the plate 9 and is held in position by the bolt 11.

When the part 1 is applied to a valve stem, the air in the tire or receptacle carrying the stem passes through the opening 5 and the bore 4 into the Bourdon tube 6. The tube then expands under the pressure of the air, the member 15 carried thereby moving the shorter end of the lever 16. This movement of the lever is transmitted to the plate 22 by the camming action of the pin 21 in the slot 23, and in turn the pin 20 and pointer 24 are rotated in the pressure indicating position. As the plate 22 rotates, the spring 25 will exert a pressure against its edge of sufficient strength to maintain the plate in whatever position it has been moved. Thus, when the gauge is removed from the valve stem the reading of the pressure is still indicated as the pointer does not return to zero until the end 18 of the lever is manually moved to its original position.

Although a preferred embodiment of the invention has been described and illustrated, the invention should not be understood as limited thereto, since it is susceptible of such modifications and adaptations as fall within the scope of the appended claims.

Having thus described my invention, I claim:

1. An air gauge comprising a casing having means for connecting the gauge to a valve stem, a Bourdon tube within said casing and communicating with said means, a lever pivoted in said casing and having one end operatively associated with said Bourdon tube, a rotatable pin in the casing adapted to carry a gauge pointer at one of its ends, a member mounted on said pin, and means for operatively connecting the other end of said lever with said member so that the point of connection moves concentrically to the pivot of the lever but eccentrically to the pivot of said member, said means including an arcuate slot in said member.

2. An air gauge comprising a casing having means for connecting the same to a valve stem, a Bourdon tube arranged within said casing and communicating with said means, a lever pivoted in said casing and having one of its ends operatively associated with said tube, a rotatable pin in the casing adapted to carry a gauge pointer at one of its ends, a member mounted on said pin, said member being provided with an arcuate slot eccentric to the pivotal axes of the member and said lever, and means carried by the other end of the lever and engaging in said slot.

3. An air gauge comprising a casing having means for attaching the same to a valve stem, a Bourdon tube arranged within said casing and communicating with said means, a lever having angularly disposed arms and pivoted within said casing at the junction of its arms, a pivoted member in said casing, said lever having one of its arms operatively associated with said Bourdon tube and the other of its arms connected with said pivoted member, a rotatable pin in the casing adapted to carry at one of its ends a gauge pointer, said pivoted member being mounted on said pin and having an arcuate slot therein eccentric to said pin, and a projection on the lever engaging in said slot.

4. An air gauge comprising a casing having means for attaching the same to a valve stem, a Bourdon tube arranged within said casing and communicating with said means, a bell crank lever pivoted in said casing at the junction of its arms and adjacent the periphery of the casing, said lever having one of its arms operatively associated with said Bourdon tube and its other arm provided with a projection, a rotatable pin in said casing and adapted to carry a gauge pointer at one of its ends, and a plate mounted on said pin, said plate being provided with an arcuate slot eccentric to the axes of the plate and the lever, the projection on said other arm of the lever being arranged in said slot, whereby when said lever is moved said projection will have a sliding camming action in said slot.

5. An air gauge comprising a casing having means for attaching the same to a valve stem, a Bourdon tube arranged within said casing and communicating with said means, a bell crank lever pivoted in said casing at the junction of its arms, one arm of said lever extending exteriorly of said casing and operatively associated with said Bourdon tube, the other arm of said lever being provided with a projection adjacent its end, a rotatable pin in said casing and adapted to carry a gauge pointer at one of its ends, a substantially semi-circular plate mounted on said pin, said plate being provided with an arcuate slot eccentric to the axes of the plate and the lever and adapted to receive the projection on the said other arm of the lever, and a spring engaging said plate to hold the same in the positions to which it is moved by the lever until the exteriorly extending arm of the lever is manually moved to return the plate to its original position.

6. An air gauge comprising a casing having means for attaching the same to a valve stem, a Bourdon tube arranged within said casing and communicating with said means, a rotatable pin arranged centrally of said casing and adapted to have a gauge pointer arranged on one of its ends, a plate mounted on said pin, and a lever pivoted in said casing adjacent an edge thereof and having a portion engaging the said pin upon which the said plate is mounted, said lever being operatively connected with said plate to move the same and being limited in its movement in one direction by the said pin.

In testimony whereof, I hereunto affix my signature.

JOHN C. CROWLEY.